Oct. 30, 1956 T. W. KALBOW ET AL 2,768,596
FIXTURE FOR SUPPORTING AND COOLING
ARTICLES DURING BRAZING
Filed June 4, 1953 2 Sheets-Sheet 1
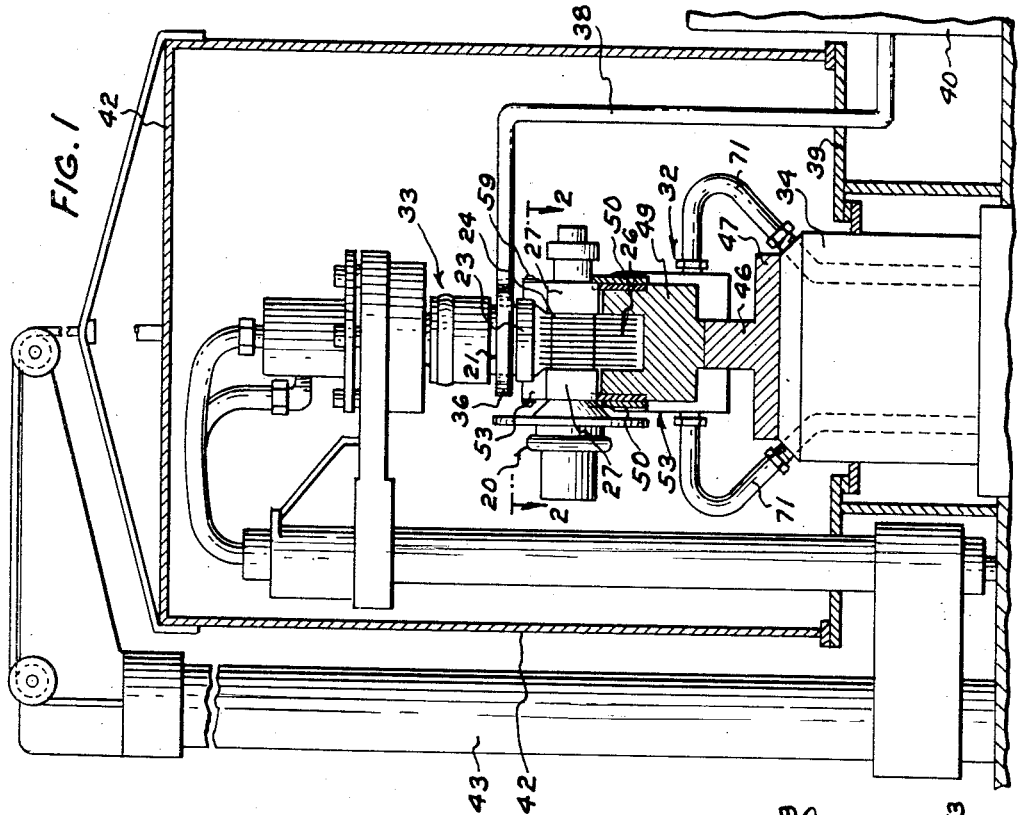
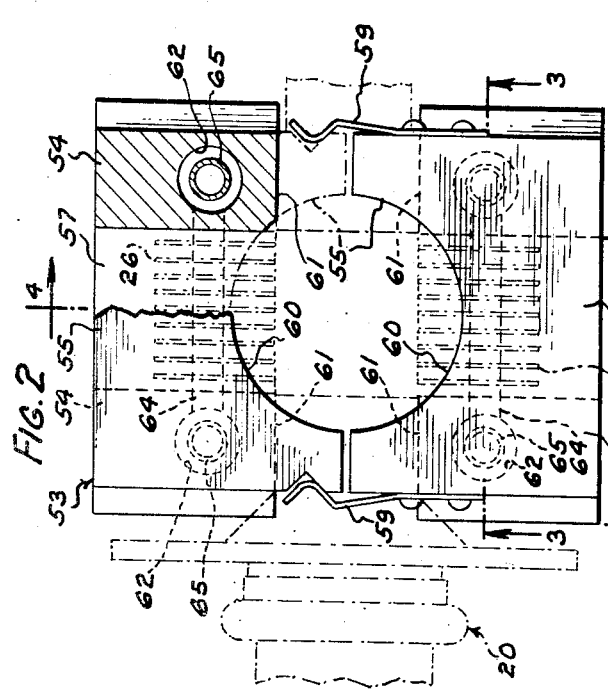
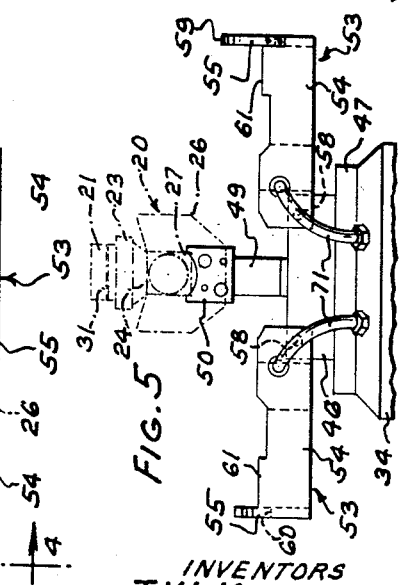
INVENTORS
T. W. KALBOW
L. O. REICHELT
BY C. B. Hamilton
ATTORNEY

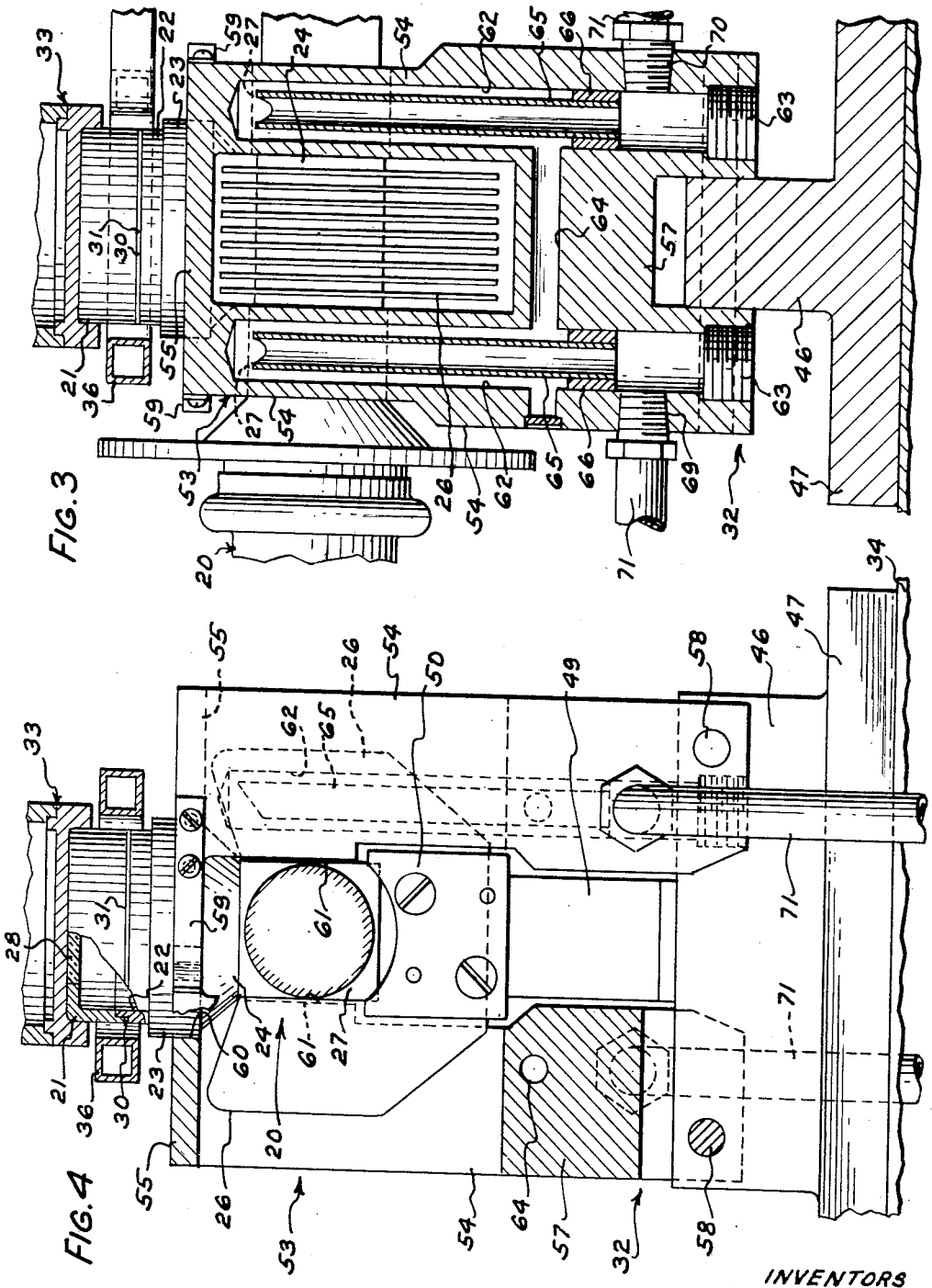

United States Patent Office 2,768,596
Patented Oct. 30, 1956

2,768,596

FIXTURE FOR SUPPORTING AND COOLING ARTICLES DURING BRAZING

Theodore W. Kalbow, Chicago, and Lester O. Reichelt, Naperville, Ill., assignors to Western Electric Company, Incorporated, New York, N. Y., a corporation of New York Application June 4, 1953, Serial No. 359,584

6 Claims. (Cl. 113—98)

This invention relates to fixtures for supporting and cooling parts while they are being brazed to each other and more particularly to a device for supporting an article of irregular shape and for cooling a portion of the article while another part is being brazed thereto.

It is an object of the present invention to provide a fixture for supporting and cooling a part while another part is being brazed thereto.

It is a further object of the present invention to provide a device having elements for supporting an irregular part while another part is being brazed thereto and having cooling elements movable into engagement with surfaces of the part for cooling portions thereof during the brazing operation.

In accordance with one embodiment of the invention there is provided a holder for supporting two components of a vacuum tube known as a magnetron while the components are being brazed together with a high frequency coil of a brazing apparatus during the fabrication of the magnetron, and a pair of hollow cooling blocks with coolant circulating therethrough is pivoted on opposite sides of the holder and having cooling surfaces engageable with surfaces on opposite sides of one component adjacent the juncture of the components being brazed for cooling said component.

Each of the cooling blocks has a pair of spaced apart parallel hollow elements and a pair of spaced apart transverse elements interconnecting the hollow elements for receiving a portion of said one component in the space between the elements of the block, and one of the transverse elements has a cooling surface engageable with and encircling substantially one half of one portion of said one component adjacent the zone of brazing, the other transverse element having a passageway establishing communication between the hollow elements through which coolant is circulated to cool the block.

Other objects and advantages of the invention will become apparent by reference to the following detailed description and the accompanying drawings illustrating a preferred embodiment thereof, in which Fig. 1 is a sectional elevational view of an apparatus for brazing parts of a magnetron to each other and showing a fixture for supporting and cooling the parts during the brazing operation;

Fig. 2 is a plan view of a portion of the supporting and cooling fixture along line 2—2 of Fig. 1 with portions broken away and shown in section and with the magnetron parts indicated in the dot-and-dash lines;

Fig. 3 is a vertical sectional view of this fixture taken on line 3—3 of Fig. 2;

Fig. 4 is an elevational sectional view of the fixture taken on line 4—4 of Fig. 2; and Fig. 5 is an elevational view of the fixture with the cooling blocks shown in open position.

The present apparatus is designed for cooling portions of an article such as a magnetron 20 during the brazing of a cap 21 (Fig. 4) to an annular wall 22 which extends upwardly from the cylindrical portion 23 of the magnetron. The cylindrical portion 23 is formed on a body member 24 which has a plurality of cooling fins 26 extending laterally therefrom on three sides. On opposite ends thereof the body member is provided with rectangular pole pieces 27. The cap 21 has a window 28 bonded thereto in an opening in the end wall of the cap. A ring of brazing material 30 is placed between the rabbeted interfitting ends of the cap 21 and the annular wall 22, and this portion of the magnetron may then be placed within a high frequency induction heating coil and heated to braze the parts together and form a bonded juncture 31 between the parts.

It is essential during the brazing operation that portions of the cap 21 and the magnetron in closely spaced relation to the juncture 31 be cooled during the brazing operation to prevent damage to the window 28 and the bonded juncture between the window 28 and the cap 21 and other bonded junctures between the various components of the magnetron. For this purpose a fixture 32 is provided for supporting the magnetron and cooling portions thereof below the juncture 31 and an upper fixture 33 is provided for cooling the upper portion of the cap 21.

The fixture 32 is fixed to the upper end of a piston 34 which is vertically reciprocable for raising the fixture 32 and the magnetron thereon from a lower loading position to a predetermined upper operative position with the parts 21 and 22 disposed within a stationary annular high frequency heating coil 36 and with the cap 21 in engagement with the upper cooling fixture 33. The piston 34 is adapted to be rotated to turn the fixture 32 and the magnetron during the brazing operation. The coil 36 is connected to and supported by conductors 38 which extend through a stationary annular platform 39 and are connected to a high frequency current generating device 40. A counter-balanced glass hood 42 adjustably supported from the upper end of a standard 43 is adapted to be lowered over the brazing apparatus in engagement with the platform 39 to form a chamber from which the atmosphere may be flushed and a brazing gas supplied thereto in which the brazing operation is performed.

The fixture 32 comprises a support or block 46 formed integral with and extending upwardly from a base plate 47 which is secured to the piston 34. A holder 49 is secured to the support 46 and has a pair of recessed members 50 forming seats for receiving a rectangular pole piece 27 therein to support the magnetron in a predetermined position with the parts 21 and 22 disposed uppermost.

A pair of cooling blocks 53 are pivotally mounted on the support 46 on opposite sides of the holder 49 for movement into engagement with portions of the magnetron. Each block 53 comprises a pair of hollow leg elements 54 spaced apart a predetermined distance for receiving portions of the cooling fins 26 therebetween. The legs 54 of the cooling blocks are connected together at their upper ends (Fig. 3) by a transverse plate or web portion 55, and at a point intermediate the ends thereof the legs are interconnected by a portion 57. The lower ends of the legs straddle the support 46 and are pivotally supported on pins 58 extending through apertures in the legs and the support 46.

The cooling blocks are adapted to be moved from an open position (Fig. 5) with the blocks disposed substantially horizontally for permitting the placing and removal of a magnetron onto and from the holder 49, to a closed position, with the cooling blocks 53 disposed substantially vertically and with portions thereof in engagement with the magnetron. The pivot pins 58 are disposed to one side of the center of each of the cooling blocks 53 (Fig. 4) whereby when in closed position the cooling blocks are urged by gravity toward each other and into engagement with the magnetron. If desired, spring clips 59 may be mounted on the upper portion of one of the blocks for engagement with sloping surfaces on the other block to urge and yieldably retain the cooling blocks in engagement with the magnetron.

The plate portion 55 has a recess therein forming a substantially semi-cylindrical cooling surface 60 engageable with the cylindrical portion 23 of the magnetron, and the upper portion of the legs 54 are provided with offset flat cooling surfaces 61 movable into close proximity to the opposite flat faces of the pole pieces 27 (Fig. 4). Each of the legs 54 has a bore 62 drilled therein and extending into close proximity to the top of the plate 55 and closed at the bottom by plugs 63, and a transverse passageway 64 in the cross piece 57 of the cooling blocks establishes communication between the bores 62. A pipe 65 is mounted in each of the bores 62 in spaced relation to the walls thereof and with the ends of the pipe in spaced relation to the ends of the bore. The pipes 65 are secured at their lower ends (Fig. 3) within the bores 62 by collars 66. Inlet and outlet ports 69 and 70, respectively, are formed in the lower ends of the legs 54 and have flexible conduits 71 connected thereto which pass through the piston 34 and are connected to means for circulating a coolant through the blocks 53. Coolant entering in the port 69 flows upwardly through the interior of the pipe 65 to the upper end of the bore 62 and then flows downwardly in the bore on the outside of the pipe and laterally through the passageway 60 into the bore 62 in the outer leg and upwardly to the top of the bore 62 on the outside of the pipe 65 and downwardly through the inside of the pipe and out through the outlet port 70. As it circulates through the upper ends of the bores 62 in the cooling blocks 53, the coolant cools the cylindrical and flat cooling surfaces 60 and 61, which in turn serve to cool portions of the magnetron engaged thereby and in close proximity thereto. Thus, during the brazing of the cap 21 to the annular wall 22 of the magnetron, the cooling blocks 53 serve to effectively cool the portions of the magnetron below the juncture of the parts 21 and 22 being brazed and thereby prevent damage to other portions of the magnetron from excessive heat. The cooling blocks also serve to cool the magnetron after the brazing operation to a temperature permitting the magnetron to be safely handled.

The cooling fixture 33 is disclosed and claimed in the co-pending application of T. W. Kalbow and L. O. Reichelt, Serial No. 359,585, filed June 4, 1953.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for supporting and cooling an article while a part is being brazed thereto comprising a base, means on said base for supporting an article thereon in a brazing position, a pair of hollow cooling blocks having cooling surfaces conforming to portions of the article adjacent the zone of brazing, means on said base for pivotally mounting said blocks for movement to and from a closed position with the cooling surfaces thereof in engagement with opposite sides of said article and with the axis of oscillation of the blocks at the lower portion thereof and on opposite sides of said article supporting means, means for yieldably maintaining said cooling blocks in said closed position, and means for circulating a liquid coolant through said hollow cooling blocks.

2. A fixture for supporting and cooling an article while a part is being brazed thereto comprising a base, means on said base for supporting an article thereon in a brazing posiiton, a pair of hollow cooling blocks having cooling surfaces conforming to portions of the article adjacent the zone of brazing, means for pivotally mounting said cooling blocks on said base for movement about horizontal axes to and from a substantially vertical position with the cooling surfaces in engagement with said article and with said axes disposed on opposite sides of said article holding means and below and on one side of the center of gravity of each of said blocks when said cooling blocks are in the vertical position to cause the cooling blocks when in said vertical position to be maintained in engagement with said article, and conduits on said blocks connectible to means for supplying and circulating a coolant through said hollow cooling blocks.

3. A fixture for supporting and cooling an article while a part is being brazed thereto comprising a base, a holder on said base for supporting an article thereon in a brazing position, a pair of hollow cooling blocks having recessed portions providing cooling surfaces conforming to portions of the article, means pivotally mounting said cooling blocks at one end thereof on said base for movement about horizontal axes on opposite sides of the holder to and from substantially vertical positions above their axes with the cooling surfaces in engagement with and substantially encircling a portion of said article adjacent the zone of brazing, spring means on one of said cooling blocks engageable with the other cooling blocks for releaseably and yieldably maintaining the blocks in engagement with the article, and conduits on said blocks connectible to means for supplying coolant to the hollow blocks.

4. A fixture for supporting and cooling an article while a part is being brazed thereto comprising a base, a holder on said base for supporting an article thereon in a brazing position, a pair of cooling blocks, each of said blocks having a pair of spaced apart parallel hollow elements and a pair of spaced apart transverse elements interconnecting the adjacent end portions of said parallel elements for receiving a portion of the article therebetween, one of said transverse elements being disposed at the ends of said parallel elements and having a recess providing cooling surfaces conforming to and engageable with a portion of the article, the other of said transverse element having a passageway interconnecting the interiors of the parallel elements, a pair of conduits connected to said hollow elements of each of said cooling blocks and connectible to means for supplying and circulating coolant through said blocks, means mounting said blocks on the base on opposite sides of the holder for movement into engagement with an article on the holder and with the cooling surfaces of the blocks substantially encircling a portion of the article adjacent the zone of brazing.

5. A fixture for supporting and cooling an article while a part is being brazed thereto comprising a base, means on said base for supporting an article thereon in a brazing position, a pair of cooling blocks, each of said blocks having a pair of parallel hollow elements and a pair of spaced apart transverse elements interconnecting the adjacent end portions of the parallel elements for receiving a portion of the article in the space between the elements, one of said transverse elements being disposed at the ends of said parallel elements and having a recess providing cooling surfaces conforming to and engageable with a portion of the article, the other of said transverse elements being disposed in spaced relation to said one transverse element and the other ends of the parallel elements and having a passageway interconnecting the interiors of the hollow elements, ports in said hollow elements connectible to means for supplying coolant thereto for cooling the blocks, means on said base pivotally mounting said blocks on opposite sides of the article for movement to and from a closed position with the cooling surfaces of the blocks in engagement with and substantially encircling a portion of the article adjacent the zone of brazing, and means for retaining said cooling blocks in said closed position.

6. A fixture for supporting and cooling an article while a part is being brazed thereto comprising a base, a holder on said base for supporting an article thereon in a brazing position, a pair of cooling blocks, each of said blocks having a pair of spaced apart parallel elements and a pair of spaced apart transverse elements interconnecting the adjacent end portions of said parallel elements for receiving a portion of the article in the space between the elements, each of said parallel elements having a longitudinally extending bore therein closed at one end of said element and having a port at the other end thereof, one of said transverse elements on each of said cooling blocks being disposed at one end of said parallel elements and having a cooling surface conforming to and engageable with a portion of the article adjacent the zone of brazing on the article, the other of said transverse element being disposed in spaced relation to said one transverse element and the other ends of said parallel elements and having a passageway interconnecting the bores in said parallel elements, a tube mounted in the bore of each of said parallel elements in spaced relation to the walls and the closed end thereof for establishing communication between said port and said closed end of the bore through the inside of the tube and between said closed end of the bore and said transverse passageway on the outside of said tube whereby coolant may be supplied to one port and caused to circulate through both of the parallel elements in sequence and out the other port to cool the cooling block and the cooling surface thereon, and means on said base pivotally mounting said blocks on opposite sides of the holder for movement to and from a closed position with the cooling surfaces thereof in engagement with and substantially encircling a portion of said article.

References Cited in the file of this patent

UNITED STATES PATENTS

| | | |
|---|---|---|
| 1,418,985 | Stock | June 6, 1922 |
| 2,309,518 | Luers | Jan. 26, 1943 |
| 2,428,658 | Falk et al. | Oct. 7, 1947 |
| 2,485,836 | MacConnell | Oct. 25, 1949 |